United States Patent [19]

Ochiai

[11] Patent Number: 4,858,437
[45] Date of Patent: Aug. 22, 1989

[54] MASTER CYLINDER
[75] Inventor: Chiaki Ochiai, Chiryu, Japan
[73] Assignee: Aisin Seiki Kabushiki Kaisha, Kariya, Japan
[21] Appl. No.: 197,422
[22] Filed: May 23, 1988
[30] Foreign Application Priority Data May 29, 1987 [JP] Japan .............................. 62-80885[U]

[51] Int. Cl.⁴ ................................................ B60T 11/28
[52] U.S. Cl. ...................................... 60/562; 60/585; 60/589
[58] Field of Search ................. 60/562, 584, 585, 589, 60/594, 592

[56] References Cited

U.S. PATENT DOCUMENTS

| | | | |
|---|---|---|---|
| 2,174,615 | 10/1939 | Bowen et al. | 60/562 |
| 3,698,190 | 10/1972 | Miyai | 60/562 |
| 3,729,932 | 5/1973 | Nakashima | 60/562 X |
| 3,889,469 | 6/1975 | Cryder et al. | 60/562 |
| 4,642,990 | 2/1987 | Mizusawa et al. | 91/369.1 X |
| 4,793,139 | 12/1988 | Reynolds | 60/562 |
| 4,794,757 | 1/1989 | Schluter | 60/562 |

FOREIGN PATENT DOCUMENTS

| | | | |
|---|---|---|---|
| 57855 | 8/1982 | European Pat. Off. | 60/589 |
| 3116584 | 11/1982 | Fed. Rep. of Germany | 60/589 |
| 3424513 | 1/1986 | Fed. Rep. of Germany | 60/589 |
| 2067252 | 7/1981 | United Kingdom | 60/589 |

Primary Examiner—Edward K. Look
Attorney, Agent, or Firm—Burns, Doane, Swecker & Mathis

[57] ABSTRACT

A portless-type master cylinder for use in an automotive fluid brake system has a supporting means which resiliently supports the end of a piston adjacent to a push rod so as to preserve a predetermined gap between the end of a valve rod and a stopper member when the master cylinder is not operating. With this arrangement, the wasteful stroke is minimized and the impact at the time of start-up of the master cylinder is reduced.

12 Claims, 2 Drawing Sheets

MASTER CYLINDER

FIELD OF THE INVENTION

The present invention relates to a master cylinder used in a hydraulic brake system for motor vehicles, and more particularly to a portless type master cylinder in which a piston is provided with a valve mechanism for intermittently controlling communication between a pressure chamber and a reservoir tank.

BACKGROUND OF THE INVENTION

Heretofore, both Rockeed and portless types have been known as typical types of a master cylinder used in a hydraulic circuit for vehicles.

A Rockeed type master cylinder is disclosed in, for example, Japanese Utility Model Laid-Open No. 61-59156 (1986). In this example, when a brake pedal is trod on, a piston is moved through a push rod, so that a pressure chamber is disconnected from a reservoir tank and comes into a sealed state, at a time when a piston cup has passed a compensating port. Then, the hydraulic pressure in the pressure chamber is increased while reducing the volume thereof.

In such a type master cylinder, therefore, by setting a distance between an inoperative position of the piston and the compensating port as small as possible, the hydraulic pressure in the pressure chamber can be increased as soon as the pedal is trod on and gradually at the beginning, as shown in FIGS. 3 and 4, in cooperation with the compensating port in the form of a restriction hole. This results in advantages of making small a lost stroke of the pedal as well as improving a control feeling and hydraulic operation.

In this type master cylinder, however, when the piston cup passes the compensating port, it is expanded while being subject to a hydraulic pressure in the pressure chamber with its part fretted into the compensating port. Thus, there is a fear that the piston cup would heavily be damaged and a liquid sealing function could not be maintained for a long period.

A portless type master cylinder has succeeded in solving the problem of the above type master cylinder and is disclosed in, for example, Japanese Utility Model No. 61-73467 (1986).

This type master cylinder has no compensating port, and a piston rod is fitted in a bore of the cylinder body such that it is normally urged by a return spring toward a push rod and liquid-tightly slidable within the bore. The piston includes a valve mechanism which valve is closed to seal the master cylinder when the master cylinder is in its operative position, and opened to communicate a pressure chamber and a supply chamber communicating with a reservoir when it is in its inoperative position, thereby balancing hydraulic pressures in both the chambers.

In the valve mechanism, generally, a piston has formed on the pressure chamber side a larger-diameter hole communicating with the supply chamber side through a fine hold at the center, and a valve rod having a valve body at its one end is loosely fitted in the fine hole and normally urged by a spring force toward the push rod, so that the valve body can be seated on and departed from a valve seat provided in the fine hole. Seating and departing of the valve body on and from the valve seat is effected as follows. When the brake is released, for example, the valve body is moved together with the piston toward the push rod while being seated on the valve seat by a valve spring force. Just before the piston reaches a final return position, the end of the valve rod abuts against a stop pin fixed to the cylinder body and inserted in a slit, the slit being lengthwisely formed in the piston, to thereby stop the valve rod at that position against the valve spring force.

At this time, since the piston continues its return movement, the valve body is now departed from the valve seat so that pressurized liquid in the pressure chamber is allowed to pass into the supply chamber.

Trading on the brake pedal causes the piston to be moved into the pressure chamber side through the push rod. At the beginning of this movement of the piston, the end of the valve rod remains abutted against the stop pin by virtue of the valve spring force. But the valve body starts to move together with the piston at the same time upon the valve body seating on the valve seat, to thereby increase the hydraulic pressure in the pressure chamber.

Accordingly, as will be understood from the above, the piston cup moves merely in sliding contact with the internal bore surface of the cylinder body in the foregoing portless type master cylinder, so the piston cup will most likely not be damaged and its liquid sealing function can be held for a long period.

In the portless type master cylinder, however, since the valve body formed of an elastic material such as rubber is deformed and extended toward the valve seat in the piston hole while being subject to the hydraulic pressure in the pressure chamber, the piston body is less easily departed from the valve seat when the piston is returned, resulting in a drawback that the brake drags. To prevent such a drawback, the length of the valve rod must be relatively increased to ensure a spacing between the valve body and the valve seat when the valve is open, taking into account the extended amount of the valve body.

The increased length of valve rod means that the time necessary for the valve body seating the valve seat is prolonged upon tread-on of the brake.

FIG. 3 and FIG. 4, which is an enlarged view of a part of FIG. 3, graphically show the magnitude of output versus a pedal stroke in Rockeed type and portless type master cylinders. As will be seen from these figures, the latter type is delayed in its starting of the output compared with the former type. This delay is consistently maintained over the entire stroke. In particular, it will be also found from FIG. 4 that the Rockeed type master cylinder has its output gradually increased at the beginning of the pedal tread-on stroke, while the portless type master cylinder has its output drastically raised up at an initial moment and then gradually increased.

This means that the portless type has a larger lost stroke than the Rockeed type, and it also accompanies the problem of a less comfortable feeling due to the rising shock.

SUMMARY OF THE INVENTION

It is an object of the present invention to overcome the above-mentioned problem encountered in adopting a portless type master cylinder, thereby making a lost stroke as small as possible and eliminating the rising shock of output.

Another object of the present invention is to provide a master cylinder comprising; a piston liquidtightly and slidably fitted in an internal bore of a cylinder body for defining in the internal bore a supply chamber normally communicating with a reservoir tank and a pressure chamber normally communicating with a hydraulic line; a valve rod assembled into a stepped hole formed at the end of the piston on the side near the pressure chamber to communicate the pressure chamber and the supply chamber with each other, the valve rod being movable in the direction of sliding of the piston; a valve body attached to the valve rod to be abutted against and departed from a valve seat formed in the stepped hole of the piston for intermittently controlling communication between the supply chamber and the pressure chamber; a valve spring disposed in the stepped hole of the piston for urging the valve body toward the valve seat; a stopper member fixedly provided in the internal bore of the cylinder body for causing the valve body to be departed from the valve seat against the valve spring when the end of the valve rod abuts against the stopper member; a return spring stretched in the pressure chamber for urging the piston toward the supply chamber, the mater cylinder further comprising support means for elastically supporting the end face of the piston facing the supply chamber, so that the valve body is seated on the valve seat with a predetermined gap left between the end of the valve rod and the stopper member during an inoperative state of the master cylinder.

When a brake pedal is trod on, the piston starts to move toward the pressure chamber through a push rod. At this time, in the present invention, since the valve body is seated on the valve seat prior to tread-on of the pedal, the pressure chamber is held in a sealed state and, hence, the hydraulic pressure (output) is increased in response to changes in the volume of the pressure chamber due to movement of the piston without suffering from any shocks, as soon as the piston starts moving.

During a return stroke of the piston, a negative pressure may be produced in the pressure chamber due to line resistance of a brake piping, for example, and hydraulic liquid may be sucked into the pressure chamber from the supply chamber bypassing the rear surface of the piston cup through a hole formed in the land of the piston. If such a condition continues, the hydraulic pressure in the pressure chamber would be increased by a value corresponding to the amount of hydraulic liquid sucked from the supply chamber, resulting in a fear of drag, when the hydraulic liquid is refilled into the pressure chamber from the wheel cylinder. Taking an example the tandem type, in accordance with the present invention, the sum of the hydraulic pressure in the pressure chamber and the secondary spring force overcomes the primary spring force, causing the piston to be moved toward the push rod beyond a normal neutral position (return home position). Upon this movement, the end of the valve rod having been held spaced from the stopper member is now abutted against the stopper member, so that the valve body is departed from the valve seat and the pressurized liquid in the pressure chamber is passed into the supply chamber. Thereafter, when the hydraulic pressure in the pressure chamber reaches a predetermined level, the primary spring force acts to returns the piston into an original neutral position and, at the same time, the end of the valve rod leaves the stopper member to bring the valve into a closed state again. In this way, whenever the neutral condition is broken and the hydraulic pressure in the pressure chamber becomes higher than that in the supply chamber for some reason, the vale repeats the foregoing operation; i.e., it is first opened for discharge of the extra pressurized liquid and then closed at a time when a balanced state is established among the hydraulic pressures in both chambers and the spring forces.

DETAILED DESCRIPTION OF THE INVENTION

A typical embodiment of the present invention will be described below with reference to the drawings.

Figure 1:
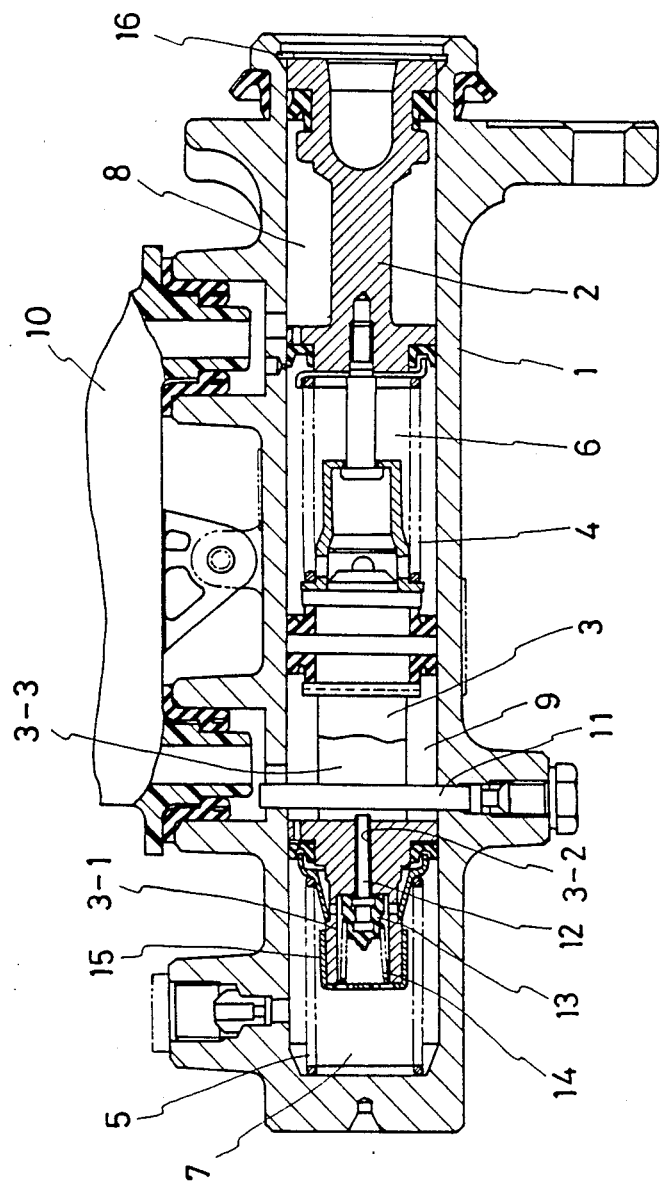
FIG. 1 is a sectional view of principal components of a tandem type portless master cylinder showing a typical embodiment of the pressure invention.

FIG. 1 shows, in section, principal components of a tandem type portless master cylinder representing the typical embodiment.

A cylinder body 1 has a bottom-equipped cylindrical form with one end open. Within an internal bore of the cylinder body, there are disposed a primary piston 2 and a secondary piston 3 spaced from each other and liquid-tightly slidable therein with the aid of cup-like sealing members.

A primary return spring 4 is interposed between the front end face of the primary piston 2 and the rear end face of the secondary piston 3 to form a first pressure chamber 6 communicating with a braking hydraulic line, for example. A secondary return spring 5 is interposed between the secondary piston 3 and the bottom face of the cylinder body 1 to form a second pressure chamber 7 communicating with the hydraulic line.

A first supply chamber 8 communicating with a reservoir tank 10 is defined between the internal bore surface of the cylinder body 1 and the primary piston 2. Similarly, a second supply chamber 9 also communicating with the reservoir tank 10 is defined between the internal bore surface of the cylinder body 1 and the secondary piston 3.

The secondary piston 3 has formed in its end face directing to the second pressure chamber a stepped hole comprising a larger-diameter hole 3-1 extending in the axial direction and a smaller-diameter hole 3-2 formed continuously therewith. Further, a slit 3—3 extending in parallel to the cylinder axis is thoroughly defined substantially at the center of the piston 3. The axial length of the slit 3—3 is set slightly larger than that of the piston, and a stop pin 11 in inserted through the slit 3—3 perpendicular to the cylinder axis. The stop pin 11 has its opposite ends both fixed to the cylinder body 1.

On the other hand, a valve rod 12, to one end of which is fixed a valve body 13 formed of an elastic material such as rubber, is accommodated in and inserted through the larger-diameter hole 3-1 and the smaller-diameter hole 3-2 of the secondary piston 3. The valve body 13 is normally urged toward a push rod by a valve spring 14 interposed between itself and a cup-like retainer 15 fixed to the end of the secondary piston 3.

In this embodiment, resilient forces of the primary return spring 4 and the secondary return spring 5 are preset as follows. The primary return spring 4 has a larger resilient force than that of the secondary return spring 5. When the master cylinder is in an inoperative state and the interior of the second pressure chamber 7 is subject to a predetermined static hydraulic pressure, with the resilient force of the primary return spring 4, the slit end of the secondary piston 3 on the side near the second pressure chamber will not completely return to a position where it abuts against the stop pin 11, and the end of the valve rod 12 also will not reach a position where it abuts against the stop pin 11. In other words, the resilient force of the valve spring 14 causes the valve body 13 to be seated on a valve seat in the larger-diameter hole 3-1 of the secondary piston 3, thereby holding the valve in a closed state. Further, the primary piston 2 is urged by both the return springs 4, 5 rightward on the view, and has its right end abutting against a snap ring 16 fixedly placed in an inner hole opening of the cylinder body 1. During an inoperative state of the master cylinder, the pistons 2, 3 are held in their positions as shown in FIGS. 1.

Operation of the master cylinder thus arranged will be described below.

First, when the brake pedal is actuated, the primary piston 2 is pushed leftward on the view by a booster push rod (not shown) against the resilient force of the primary spring 4. This causes the primary cup to slide over a compensating port opening into the first pressure chamber 6 to interrupt communication between the reservoir tank 10 and the first pressure chamber 6, so that the hydraulic pressure in the first pressure chamber 6 is raised up and acts on a braking hydraulic line. At the same time, the primary return spring 4 also pushes the secondary piston 3 leftward on the view with the valve body remaining seated (i.e., with the valve remaining closed). Thus, as soon as the secondary piston 3 starts to move, the hydraulic pressure in the second pressure chamber 7 is raised up and acts on the braking hydraulic line as well.

Figure 4:
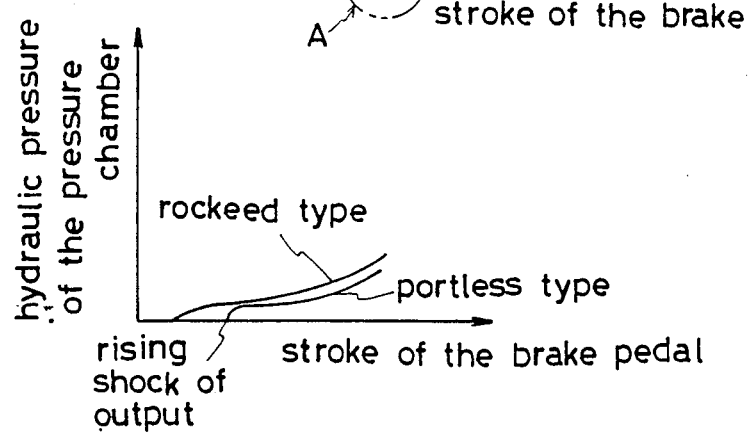
FIG. 4 is an enlarged graph of part A in FIG. 3.

At this time, the conventional similar portless type master cylinder has a relatively large lost stroke and suffers from the rising shock, as shown in FIG. 4 and mentioned above. To the contrast, in this embodiment, as soon as the push rod acts its force on the primary piston 2, the secondary piston 3 is caused to start sliding. From the same moment, the hydraulic pressure in the second pressure chamber 7 begins to rise up, resulting in a very small lost stroke. In addition, with the valve body 13 normally remaining seated on the valve seat, there occurs no abrupt increase in the hydraulic pressure and, hence, the so-called rising shock can be avoided.

Then, when the brake pedal is released, the pistons 2, 3 are returned to their inoperative positions by the resilient forces of both return springs 4, 5. At this time, the pistons in the master cylinder of this embodiment are returned as follows. More specifically, as mentioned above, the resilient force of the primary return spring 4 is preset equal to the sum of the hydraulic pressure in the second pressure chamber 7 and the resilient force of the secondary return spring 5, when that hydraulic pressure is in a predetermined range. This maintains such a state that the end of the secondary piston 3 on the side near the second pressure chamber 7 will not abut against the stop pin 11, and the end of the valve rod 12 accommodated in the hole of the piston 3 also will not abut against the stop pin 11, whereby the valve body 13 is continuously kept seated on the valve seat (i.e., in a valve-closed state). Meanwhile, during a return stroke of the secondary piston 3, a negative pressure produced in the second pressure chamber 7 due to the line resistance of a brake piping may suck a hydraulic liquid from the second supply chamber 9 (the reservoir tank 10) into the second pressure chamber 7 bypassing the rear surface of the piston cup through a small hole defined in the land of the secondary piston 3. After that, when the hydraulic liquid is refilled into the second pressure chamber 7 from the wheel cylinder, the hydraulic pressure in the second supply chamber 9 is increased by a value corresponding to the amount of hydraulic liquid previously sucked from the second supply chamber 9, resulting in a fear that the brake would drag. On the contrary, in this embodiment, if the hydraulic pressure in the second pressure chamber 7 is increased, the secondary piston 3 overcomes the opposing force of the primary return spring 4 and slides toward the push rod, whereupon the end of the valve rod 12 slightly projecting from the smaller-diameter hole 3-2 of the secondary piston 3 abuts against the stop pin 11 to move the valve rod 12 leftward on the view while overcoming the resilient force of the valve spring 14. This causes the valve body 13 to be departed from the valve seat, allowing the extra pressurized liquid to flow into the second pressure chamber 9. At a time when the hydraulic pressures in two chambers 7, 9 have reached a balanced state, the secondary piston 3 is returned to its original home position by the resilient force of the primary return spring 4 and, concurrently, the valve is closed. As a result, upon the brake pedal being released, the brake is removed positively without any adverse effects such as drag.

Figure 2:
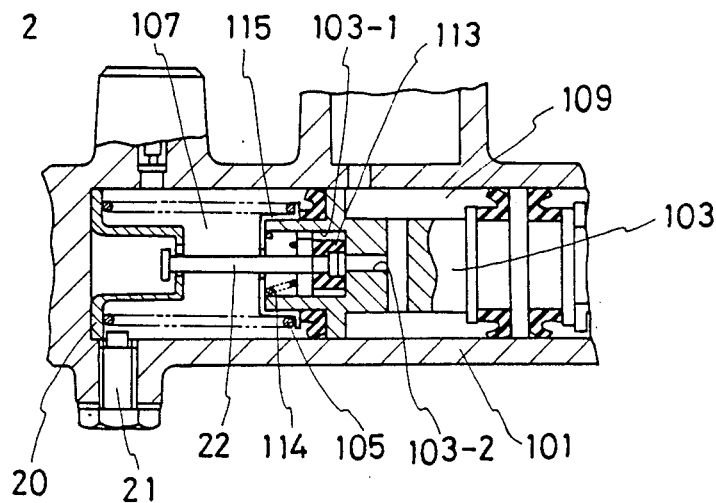
FIG. 2 shows a part of another embodiment of the present invention.
Figure 3:
FIG. 3 is a characteristic graph of output versus a pedal stroke in conventional Rockeed type and portless type master cylinders.

FIG. 2 shows a part of another embodiment of the present invention in which a stop member is constituted by a holder 20 attached to the internal bore bottom face of a cylinder body 101. The holder 20 is engaged with the distal end of a stop bolt 21 screwed into the cylinder body 101 such that the holder 20 is immobile in the axial direction. The end of a valve rod 22 is disposed to be engaged with or disengaged from the holder 20, and engagement of the end of the valve rod 22 with the holder 20 enables the valve rod 22 and a valve body 113 to move relative to a secondary piston 103. In this embodiment, as with the foregoing embodiment shown in FIG. 1, resilient forces of two return springs are set so that during an inoperative state of the master cylinder, the end of the valve rod 22 is disengaged from the holder 20 and the valve body 113 remains seated on the valve seat in a larger-diameter hole 113-1 by a valve spring 114. It is thus possible to make a lost stroke very small and avoid the rising shock. Incidentally, the same components as those in FIG. 1 are designated in FIG. 2 at the same reference numerals but added with 100, and they function as with the embodiment of FIG. 1.

In the above, the tandem type portless master cylinder has been described by way of example. But the present invention is not necessarily limited to the tandem type and also applicable to a single type portless master cylinder, for example. In this case, a spring member corresponding to the primary return spring may be fixed onto the end face of the piston or cylinder body facing the push rod.

As fully described above, according to the present invention, since in a portless type master cylinder, the valve rod is kept from abutting against the stopper member during an inoperative state of the master cylinder, the valve can be held in a normally closed state and the hydraulic pressure can start to act as soon as the master cylinder is operated. This makes it possible to eliminate a momentary abrupt rise in the hydraulic pressure as experienced upon the conventional valve body seating on the valve seat and, hence, to improve a control feeling. In addition, the present invention is arranged that with the piston being in its returned position, a predetermined gap is formed between the end of the valve rod and the stopper member using a resilient force of the support member on the push rod side. Therefore, if the hydraulic pressure in the pressure chamber should be increased temporarily during a return stroke of the master cylinder, the increased hydraulic pressure would acts to move the piston toward the push rod. Then, the end of the valve rod abuts against the stopper member to open the valve, so that the hydraulic pressure higher than a setting pressure in the pressure chamber can be released. This is effective in eliminating a drawback of drag, for example, as otherwise suffered from upon removal of the brake.

What is claimed is:

1. A master cylinder comprising; a piston liquid-tightly and slidably fitted in an internal bore of a cylinder body for defining in said internal bore a supply chamber normally communicating with a reservoir tank and a pressure chamber normally communicating with a hydraulic line; a valve rod assembled into a stepped hole formed at the end of said piston on the side near said pressure chamber to communicate said pressure chamber and said supply chamber with each other, said valve rod being movable in the direction of sliding of said piston; a valve body attached to said valve rod to be abutted against and departed from a valve seat formed in the stepped hole of said piston for intermittently controlling communication between said supply chamber and said pressure chamber; a valve spring disposed in the stepped hole of said piston for urging said valve body toward said valve seat; a stopper member fixedly provided in the internal bore of said cylinder body for causing said valve body to be departed from said valve seat against said valve spring when the end of said valve rod abuts against said stopper member; a return spring stretched in said pressure chamber for urging said piston toward said supply chamber, said master cylinder further comprising support means for elastically supporting the end face of said piston facing said supply chamber, so that said valve body is seated on said valve seat with a predetermined gap left between the end of said valve rod and said stop member during an inoperative state of said master cylinder.

2. A master cylinder according to claim 1, wherein said support means is constituted by a spring having one end fastened to said cylinder body near the opening of the internal bore thereof and the other end fastened to said piston for urging said piston toward said pressure chamber.

3. A master cylinder according to claim 2, wherein the load of said spring is set larger than that of said return spring.

4. A master cylinder according to claim 3, wherein when the sum of the force of a hydraulic pressure in said pressure chamber pushing the end face of said piston facing said pressure chamber and the load of said return spring is larger than the load of said spring during an inoperative state of said master cylinder, said piston slides toward said supply chamber and the end of said valve rod abuts against said stopper member, causing said valve body to be departed from said valve seat against said valve spring.

5. A master cylinder according to claim 4, wherein said stopper member is constituted by a stop pin inserted through an axially extending slit hole, which is formed in said piston and into which one end of said stepped hole is opened, and having its opposite ends fixed to said cylinder body for relative movement with respect to said piston.

6. A master cylinder according to claim 3, wherein said stopper member is constituted by a holder fixed to the internal bore bottom face of said cylinder body, the end of said valve rod is attached to said holder to be movable in the direction of sliding of said piston, and when the sum of the force of a hydraulic pressure in said pressure chamber pushing the end face of said return spring is larger than the load of said spring during an in operative state of said master cylinder, said piston slides toward said supply chamber and the end of said valve rod engages with said holder, causing said valve body to be departed from said valve seat against said valve spring.

7. A master cylinder comprising; two pistons liquid-tightly and slidably fitted in an internal bore of a cylinder body for defining in said internal bore two supply chambers normally communicating with a reservoir tank and two pressure chambers normally communicating with a hydraulic line; a valve rod assembled into a stepped hole formed at the end of at least one of said pistons on the side near the corresponding pressure chamber to communicate one of said pressure chambers and one of said supply chambers with each other, said valve rod being movable in the direction of sliding of said pistons; a valve body attached to said valve rod to be abutted against and departed from a valve seat formed in the stepped hole of said one piston for intermittently controlling communication between said one supply chamber and said one pressure chamber; a valve spring disposed in the stepped hole of said one piston for urging said valve body toward said valve seat; a stopper member fixedly provided in the internal bore of said cylinder body for causing said valve body to be departed from said valve seat against said valve spring when the end of said valve rod abuts against said stopper member; and a return spring stretched in said one pressure chamber for urging said one piston toward said one supply chamber, said master cylinder further comprising support means for elastically supporting the end face of said one piston facing said one supply chamber, so that said valve body is seated on said valve seat with a predetermined gap left between the end of said valve rod and said stopper member during an inoperative state of said master cylinder.

8. A master cylinder according to claim 7, wherein said support means is constituted by a spring having one end fastened to the other cylinder body facing the other pressure chamber for urging said one piston toward said one pressure chamber.

9. A master cylinder according to claim 8, wherein the load of said spring is set larger than that of said return spring.

10. A master cylinder according to claim 9, wherein when the sum of the force of a hydraulic pressure in said one pressure chamber pushing the end face of said one piston facing said one pressure chamber and the load of said return spring is larger than the load of said spring during an inoperative state of said master cylinder, said one piston slides toward said the other supply chamber and the end of said valve rod abuts against the stopper member, causing said valve body to be departed from said valve seat against said valve spring.

11. A master cylinder according to claim 10, wherein said stopper member is constituted by a stop pin inserted through an axially extending slit hole, which is formed in said one piston and into which one end of said stepped hole is opened, and having its opposite ends fixed to said cylinder body for relative movement with respect to said one piston.

12. A master cylinder according to claim 9, wherein said stopper member is constituted by a holder fixed to the internal bore bottom face of said cylinder body, the end of said valve rod is attached to said holder to be movable in the direction of sliding of said pistons, and when the sum of the force of a hydraulic pressure in said one pressure chamber pushing the end face of said one piston facing said one pressure chamber and the load of said return spring is larger than the load of said spring during an inoperative state of said master cylinder, said piston slides toward said the other supply chamber and the end of said valve rod engages with said holder, causing said valve body to be departed from said valve seat against said valve spring.

* * * * *